March 11, 1947.  L. B. LYNN  2,417,081
STABLE ELEMENT
Filed July 30, 1945  2 Sheets-Sheet 1

WITNESSES:

INVENTOR
LAWRENCE B. LYNN.
BY
ATTORNEY

March 11, 1947. L. B. LYNN 2,417,081
STABLE ELEMENT
Filed July 30, 1945 2 Sheets-Sheet 2

WITNESSES:
E. H. Lutz.
H. B. Brown

INVENTOR
LAWRENCE B. LYNN.
BY
ATTORNEY

Patented Mar. 11, 1947

2,417,081

UNITED STATES PATENT OFFICE 2,417,081

STABLE ELEMENT

Lawrence B. Lynn, Wilkinsburg, Pa., assignor to Westinghouse Electric Corporation, East Pittsburgh, Pa., a corporation of Pennsylvania Application July 30, 1945, Serial No. 607,711

4 Claims. (Cl. 74—5)

The invention relates to a stable element of the character disclosed and claimed in the application of Clinton R. Hanna and myself, Serial No. 524,560, filed March 1, 1944, and it has for an object to provide apparatus of this character wherein the gyro-vertical is slowly rotated to neutralize or average to zero the effect of any unbalance so far as displacing the gyro spin axis from the vertical is concerned.

With the apparatus such as disclosed in said application, drift or wandering of the reference or vertical axis has been observed, particularly when the train or azimuth bearing is fixed. Such drift of the reference may be accounted for by several factors, such as torques imposed on the gyro by shifting of the center of the mass of the gyro and pendulum structures due to thermal expansion and to tolerances in fits and the bearings; relative positional displacement of the various components for the reasons just indicated; erratic torques imposed on the gyro by lead wire stiffness, nonuniform pick-off contact pressures, gimbal bearing friction, and, less directly, by servo-motor amplifier tube differences and mass unbalances of the follow-up structures; and unbalanced torques produced by shifting of the center of mass of inertia member of the nutation damper relative to the gyro axis. By scanning the unit continuously about a vertical axis, any unbalances initially present, or which may be developed, average to zero in their effect to displace the gyro spin axis. As the stable element is called upon in service to maintain a fixed azimuth or train bearing, or sweep through a small angle for sector scanning, operational conditions are thereby introduced and which cause the stable element to fail to maintain a definite vertical reference. In accordance with the present invention, the inherent advantages of unbalance cancellation are provided at all times independently of train operating conditions of the stable element; and, to this end, the gyro-vertical, including the gyro, its magnetic erector, and the gimbal systems for supporting the gyro and the erector, is mounted for rotation about a vertical axis, coincident with the gyro or reference axis, at a uniform velocity relative to the level member or follow-up ring. Such rotation requires that the earth's rotation corrector and the servo-motor pick-offs shall be of such character as to achieve their purposes irrespective of such rotation. Therefore, these devices are carried by the level or the follow-up ring and the gyro elements cooperating therewith are circular.

These and other objects are effected by the invention as will be apparent from the following description and claims taken in connection with the accompanying drawings, forming a part of this application, in which:

Figure 1:
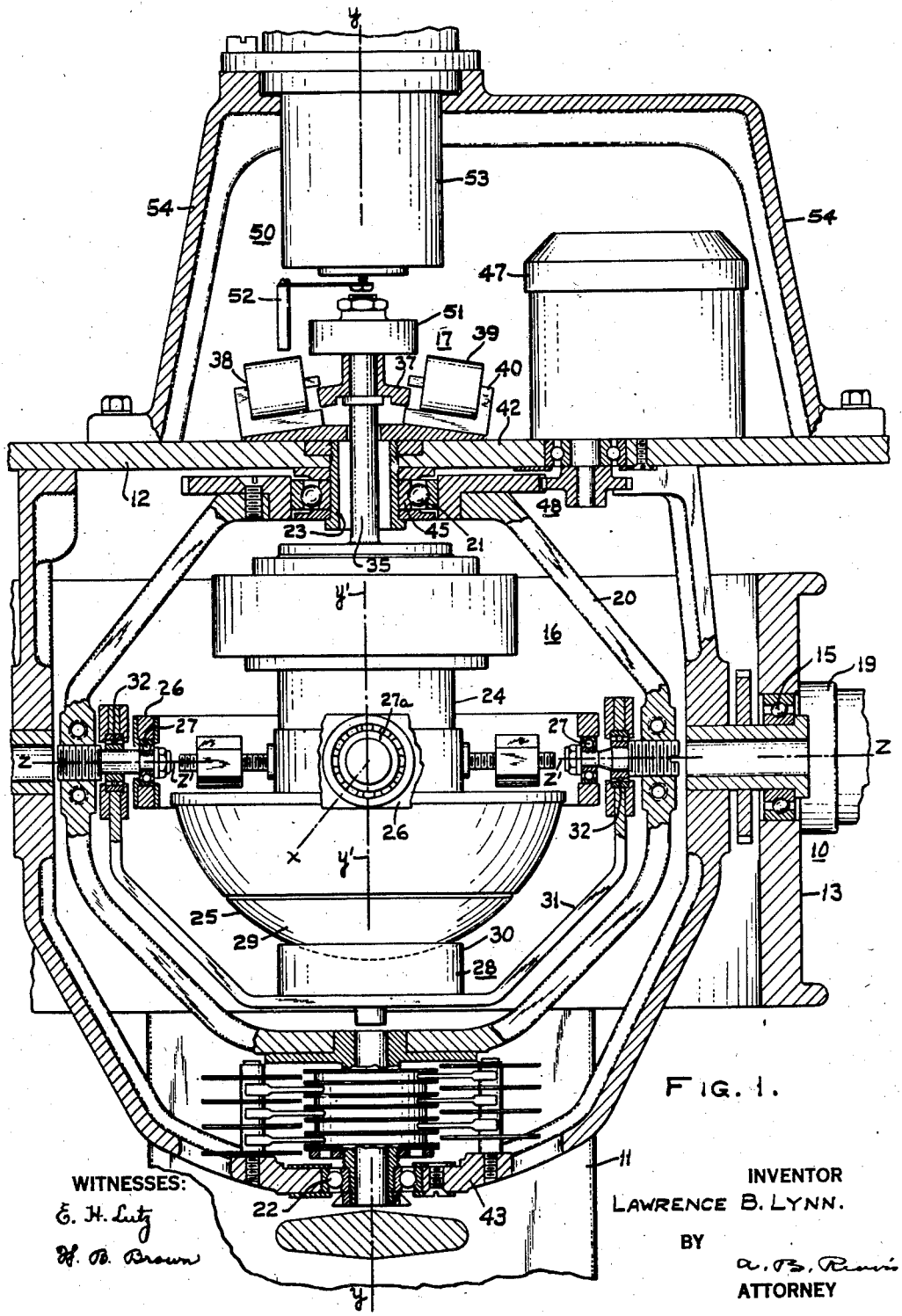
Fig. 1 is a vertical sectional view of a stable element employing the present invention.
Figure 2:
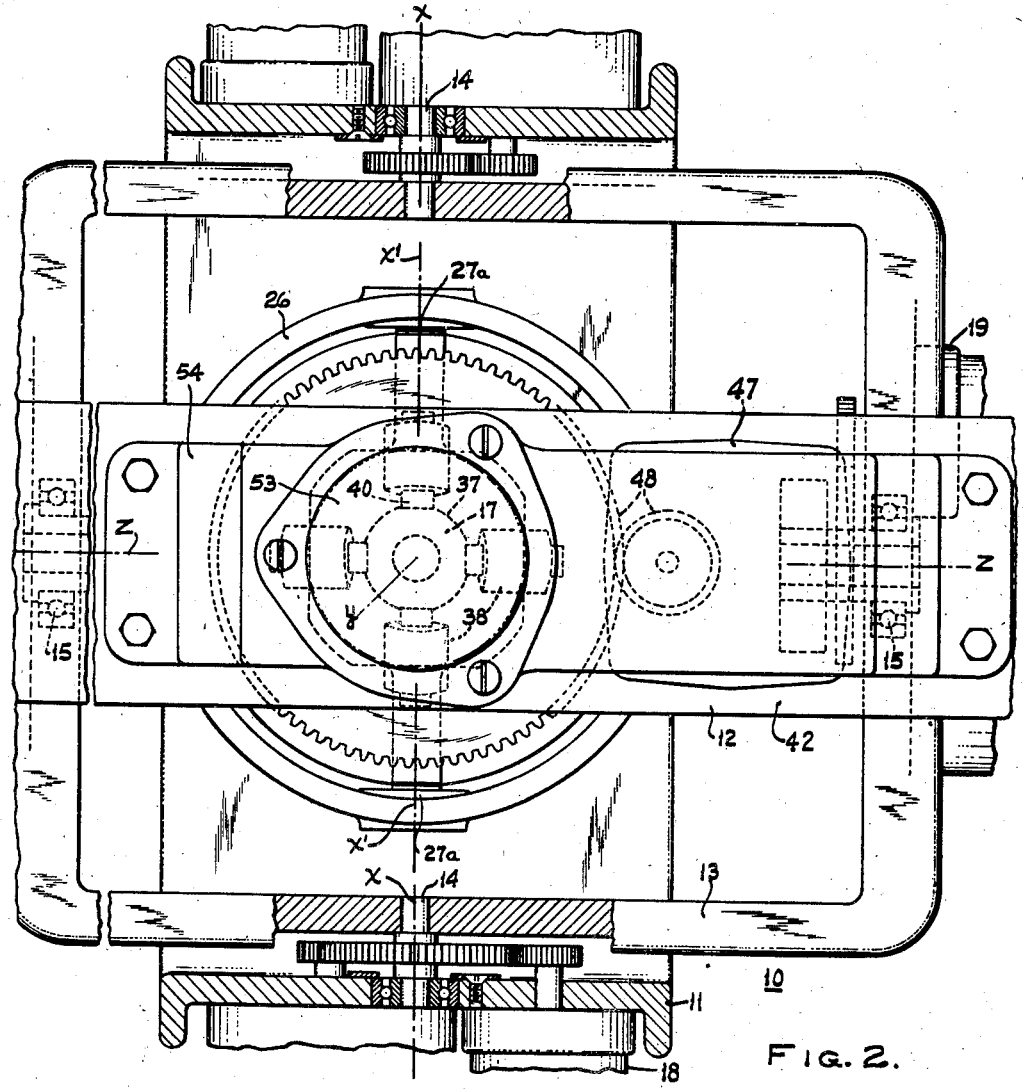
Fig. 2 is a plan view of apparatus shown in Fig. 1.
Figure 3:
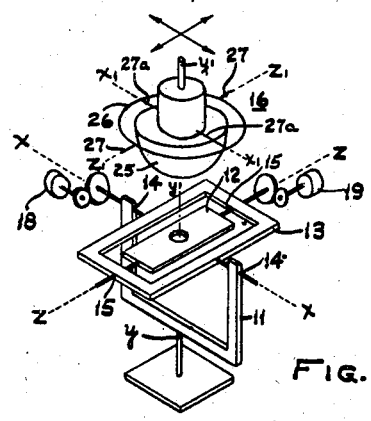
Fig. 3 is a diagrammatic view showing the geometrical relationship of principal parts of the stable element.

In the drawings, there is shown a stable element, at 10, including a yoke 11, a level 12, and a cross level 13. The yoke is mounted on any suitable structure, such as the deck of a ship, for movement about a train axis $y$—$y$ perpendicular to the deck plane. The cross level is supported from the yoke by pivots 14, 14 to provide for movement of the level 12 about the cross level axis $x$—$x$ and it supports the level by means of pivots 15, 15 for movement about the level axis $z$—$z$.

The level 12 carries a gyro-vertical, at 16, having a normally vertical reference axis $y_1$—$y_1$ and it cooperates with suitable pick-off means, at 17, to control follow-up servo-motor systems, including the motors 18 and 19 carried by the yoke 11 and by the cross level 13, respectively, the motors 18 and 19 being arranged to drive the cross level 13 and the level 12 about the cross level and level axes $x$—$x$ and $z$—$z$, respectively, so as to keep the level positioned with the pick-off means arranged in concentric relation with the gyro spin or reference axis, that is, as the gyro or reference axis is maintained in the vertical, any tendency of the level 12 to deviate from its horizontal or normal position with respect thereto is followed by operation of the servo-motor means to restore the level to the horizontal or normal position.

The level is provided with a cage 20 carrying the gyro-vertical, at 16. Upper and lower bearings 21 and 22 rotatably mount the cage on the level for movement about an axis which is at right angles to the level axis $z$—$z$ and which is vertical when the level is in horizontal position. The upper bearing 21 is supported from the level by means of a sleeve 23 serving the purpose hereinafter pointed out.

The gyro-vertical comprises a gyro casing 24, a rotor 25 journaled in the casing and having said normally vertical spin axis $y_1$—$y_1$ and a gimbal ring 26 supported from the cage by pivots 27, 27, providing for movement about the axis $z'$—$z'$ and supporting the casing by pivots 27a, 27a for movement about the axis $x'$—$x'$, the axis being at right angles to the spin axis y'—y' and axis x'—x' being arranged at right angles to the axis z'—z' and the spin axis y'—y'. As the gyro is a neutral one, the gyro-vertical also includes a magnetic erector, at 28, to give to the rotor spin axis a vertical-seeking tendency.

The magnetic erector includes a spherical element 29 carried by the rotor and cooperating with an electromagnet 30 suspended from the cage by a pendulous mounting. The pendulous mounting includes a bail 31 supported from the cage by pivot bearings 32, 32 coaxial with the gyro axis z'—z'. As pointed out in the application aforesaid, any tendency of the gyro spin axis to deviate from the vertical, as defined by the pendulous erector, is accompanied by the development of torque applied to the gyro to cause the latter to precess back to the vertical.

The gyro casing has a stem 35 coaxial with the rotor spin axis and extending through the sleeve 23 and above the upper surface of the level 12 for actuation of pick-off means, at 17, the latter preferably including an armature element or disc 37 concentric with the stem 35 and cooperating with follow-up coils 38 mounted on the level, equidistantly spaced from the cage axis, and which are symmetrical or concentric with the stem and the disc when the level is horizontal. Each coil includes primary and secondary winding 39 mounted on a U-shaped iron core 40, and the coils are disposed quadrantally, one pair of diametrically-opposed coils being disposed radially in a plane normal to the cross level axis and the other pair of coils being disposed in a plane normal to the cross level axis when both the level and cross level axes are normal to the train axis, all as more particularly pointed out in the application aforesaid. In the event of deviation of the level from horizontal, such deviation is sensed by the pick-off means, at 17, to cause operation of follow-up systems including the motors 18 and 19 carried by the yoke 11 and the cross level 13, respectively, for movement of the latter about the cross level and level axes to whatever extent may be required to restore the level to its horizontal or level condition, that is, with a predetermined surface thereof normal to the reference axis, at which time the components of the pick-off means are restored to their neutral or centered relation.

To overcome the effect of any unbalance that may be present and which would tend to cause the gyro spin axis to deviate from the vertical, the cage is mounted on the level 12, as above described, so as to be capable of slow rotation with respect to the latter about an axis at right angles to the level axis and which is vertical when the level is horizontal. To this end, the level includes spaced upper and lower members 42 and 43 between which is disposed the cage, the latter being mounted on bearings 21 and 22 carried by the members with the axes of the bearings at right angles to the level axis and normally vertical. The upper bearing 21 has its inner raceway 45 mounted on the sleeve 23 through which the stem 35 extends with a suitably large operating clearance.

The cage is rotated relative to the level by means of a motor 47 carried by the upper member 42 thereof, the motor being connected by reduction gearing, at 48, to the cage so the latter may be rotated at a suitably slow speed, for example, of the order of ten to twenty revolutions per minute. The motor preferably turns the cage in the direction of spin of the gyro.

In addition to carrying the pick-off coils 38, the upper member 42 of the level also carries a component of the earth's rotation corrector, at 50, the latter comprising a magnet 51 carried by the stem 35 and concentric with the spin axis and an armature 52 revolvable about the magnet 51 by means of a motor 53 supported by standards 54 attached to the level. As disclosed in the application aforesaid, the motor 53 is synchronously connected to a generator operated by a compass (not shown) so that the armature 52 may be adjusted angularly about the magnet 51 for the application of torque to the gyro in its proper plane to cause the gyro to precess at the same rate and direction that the earth rotates.

As the pick-off means, at 17, and the earth's rotation correction means, at 50, are arranged with components thereof which are in symmetrical coaxial relation with the gyro spin axis, and as such components may be rotated about the reference spin axis without in any way disturbing the operative effects thereof, the cage is mounted on the level member so as to be rotatable about the axis of symmetry of the components.

In operation, any unbalance that may occur in the gyro-vertical assembly, and which would tend to cause deviation of the spin axis from the vertical in the event that the assembly is not rotated about the vertical, is averaged out or compensated by having the gyro-vertical suspended with respect to a cage which is slowly rotated for this purpose.

While the invention has been shown in but one form, it will be obvious to those skilled in the art that it is not so limited, but is susceptible of various changes and modifications without departing from the spirit thereof.

What is claimed is:

1. In a stable element, a follow-up member mounted for movement about axes at right angles so that it may be positioned horizontally; servo-motor means for moving the follow-up member about said axes; a cage mounted on the follow-up member for movement about an axis which is vertical when the follow-up member is horizontal; a gyro-vertical comprising a casing, a rotor journaled in the casing, gimbal means for suspending the casing and rotor from the cage, an erector cooperating with the rotor and pendulously suspended from the cage; an actuating member coaxial with the rotor spin axis and carried by the casing; pick-off means carried by the follow-up member and operable by the actuating member to control the servo-motor means for moving the follow-up member about its mounting axes so as to maintain the latter horizontal; a motor carried by the follow-up member; and reduction gearing connecting the motor and the cage for rotation of the latter at a suitably slow speed.

2. Apparatus as claimed in claim 1 wherein the cage is rotated by the motor in the same direction as that of the gyro rotor.

3. In a stable element, a supporting member movable about a train axis, a follow-up member mounted on the supporting member for movement relative to the latter about axes at right angles so that it may be positioned horizontally for varying inclinations of the train axis; servo-motor means for moving the follow-up member about its mounting axes; a cage mounted on the follow-up member for movement about an axis which is vertical when the follow-up member is horizontal; a gyro-vertical comprising a casing, a rotor journaled in the casing, gimbal means for suspending the casing and rotor from the cage, and an erector pendulously suspended from the cage and cooperating with the gyro to impart a vertical-seeking tendency to the rotor spin axis; an actuating member coaxial with the rotor spin axis and carried by the casing; pick-off means carried by the follow-up member and operable by the actuating member to control the servo-motor means for moving the follow-up member about its mounting axes so as to maintain it horizontal; a motor carried by the follow-up member; and reduction gearing connecting the motor and the cage for rotation of the latter at a suitably slow speed.

4. In a stable element, a level member mounted for movement about a train axis and about level and cross level axes with the cross level axis arranged at right angles both to the train axis and to the level axis; a cage; means including upper and lower bearings for mounting the cage on the level member for rotation about an axis which is vertical when the level member is horizontal; a quadrantal arrangement of follow-up coils carried by the level member; said coils extending radially of the cage axis, being equidistantly spaced from the latter, and being arranged so that diametrically-opposed coils are in cage axis planes which are normal to said level and cross level axes when the level axis is normal to the train axis; servo-motor means controlled by the diametrically-opposed pairs of coils and including motors for effecting movements about the level and cross level axes; a motor carried by the level member with its rotor axially aligned with the cage and the motor being operable to maintain the position in azimuth of its rotor as changes in azimuthal position of the level member occur; an armature element fixed in relation to said rotor and disposed eccentrically with respect to the cage axis; a neutral gyro including a casing, a rotor journaled in the casing, and gimbal means for supporting the casing and rotor from the cage; an erector for the gyro and pendulously supported from the cage; an armature disc connected to the gyro casing in coaxial relation with the rotor spin axis and cooperating with the follow-up coils to control the servo-motor means to maintain the level member in position with the coils substantially centered with respect to the disc; a circular magnet connected to the gyro casing in coaxial relation with the rotor spin axis and positioned so that its field acting on the eccentric armature element applies torque to the gyro for precession of the latter in a direction opposite to precession due to earth's rotation so as to compensate for the effect of earth's rotation; and means including a motor carried by the level member for effecting rotation of the cage about its axis at a suitably slow rate.

LAWRENCE B. LYNN.

REFERENCES CITED

The following references are of record in the file of this patent:

UNITED STATES PATENTS

| Number | Name | Date |
|---|---|---|
| 1,308,783 | Gray et al. | July 8, 1919 |
| 1,679,354 | Fairchild et al. | Aug. 7, 1928 |
| 2,093,503 | Wittkuhns et al. | Sept. 21, 1937 |

FOREIGN PATENTS

| Number | Country | Date |
|---|---|---|
| 291,862 | Italy | Dec. 28, 1931 |